Nov. 25, 1924.
C. A. HAMMARLUND ET AL
1,516,725
TIRE TIGHTENER
Filed Dec. 27, 1923
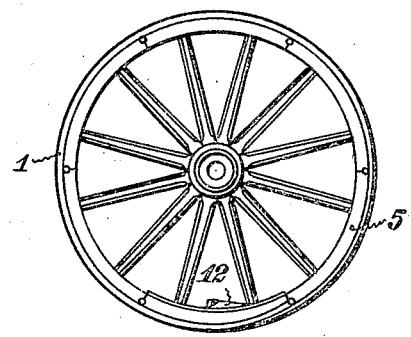
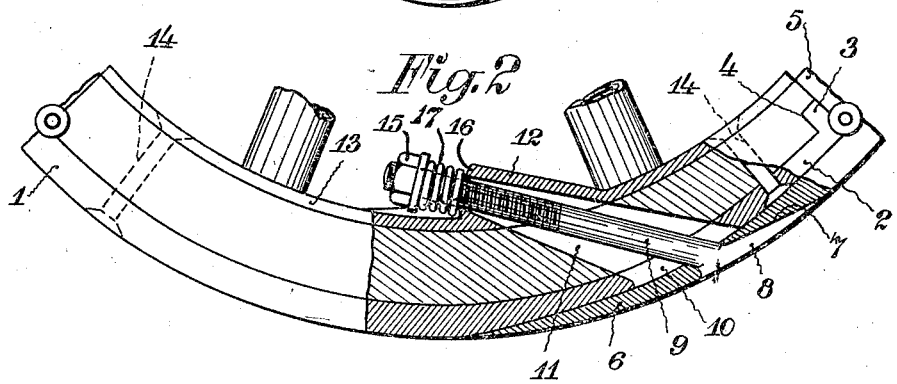
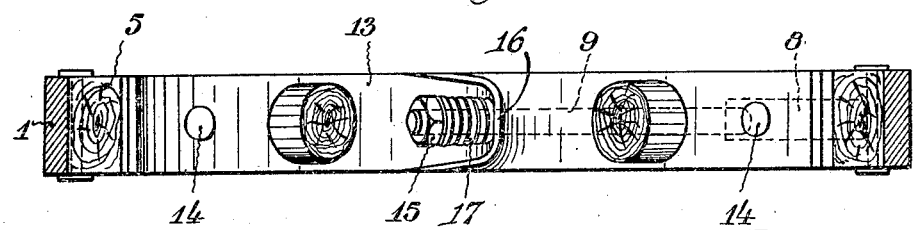
Inventors
C. A. Hammarlund
W. Segerström
by Langner, Parry, Card & Langner
Attys.

Patented Nov. 25, 1924.

1,516,725

UNITED STATES PATENT OFFICE.

CARL ALBERT HAMMARLUND, OF EKET, AND WILHELM SEGERSTROM, OF ANGELHOLM, SWEDEN.

TIRE TIGHTENER.

Application filed December 27, 1923. Serial No. 683,020.

*To all whom it may concern:*

Be it known that we, CARL ALBERT HAMMARLUND, a citizen of Sweden, residing at Eket, Sweden, and WILHELM SEGERSTROM, a citizen of Sweden, residing at Angelholm, Sweden, have invented certain new and useful Tire Tighteners, of which the following is a specification, reference being had to the accompanying drawing.

The present invention refers to wheels having fellies of wood or the like provided with open iron bands, the ends of which overlap each other and the inner end of which is secured to the felly by means of bolts, screws or the like, and the invention particularly relates to means of securing and adjusting the outer end of said iron band so that the latter always fits tightly on the felly.

Iron bands for wood fellies and provided with overlapping ends are already known the ends being usually welded together or securely fixed to each other by other suitable means.

Adjusting devices of a similar kind are also known for securing an elastic tyre to a wheel rim.

The present invention consists in the provision of an iron band with overlapping ends the outer one of which being provided with a stay, for example a bolt, adapted to pass through a longitudinal slot in the inner end of the iron band and also through a corresponding slot in the felly, a sleeve socket being arranged at the inside of the felly adapted to support the tightening member for the bolt, for example a nut, a wedge or the like, and a resilient means arranged between the end of the sleeve socket and the tightening member.

The invention further consists in the arrangement of the said bolt at an inclined position in relation to the iron band and in the bolt provided with a longitudinally extending head loosely fitting in a corresponding recess at the outside of the outer end of the band.

The invention is based on the knowledge gained by experiments and experience that the shrinking of the wheel by atmospheric influences and also the stretching of the iron band which comes about after a time and which necessitates an adjustment of the band take place comparatively slowly, so that it is not under all circumstances practically necessary that the adjustment must be automatic but it may in case of need also be carried out manually with the same result.

In the accompanying drawing Figure 1 is a side view of a wheel provided with the improved adjusting means. Figure 2 shows on a larger scale, a felly section provided with the improved means in a side view partly in section, and Figure 3 is a top view of Figure 2.

Referring to the drawing 1 denotes the iron band, the inner end 2 of which is provided with a projection 3 extending at right angles and fitting into a notch 4 provided at the circumference of the felly 5. The outer end 6 of the iron band is tapered so as to correspond with a corresponding tapering partly arranged on the felly and partly on the inner end of the band so as to secure a uniform thickness throughout the whole rim. This outer end 6 is further provided with a somewhat tapered longitudinal recess 7 into which loosely fits the correspondingly shaped head 8 of the tightening bolt 9. This bolt passes through slots 10 and 11 arranged in the inner end 2 of the band and in the felly 5 respectively and also through the sleeve socket 12, the latter being provided with a rounded off abutting surface 16 substantially at right angles to the axis of the hole in the sleeve socket and engaged by the tightening means for the bolt. It is to be observed that the said slots and the sleeve socket as well as the head of the bolt are arranged in such a manner that the bolt is positioned as nearly tangential to the iron band as possible, so that the tightening effect of the bolt may easily be obtained. The sleeve socket 12 is integral with a plate 13 which is fixed to the felly by screws or in any other suitable manner, for example, as shown in the drawing, by rivets 14 which connect the plate and the inner end of the band to the felly. In the drawing the tightening means consists of a nut 15, for which however equivalent means may be substituted. Between the nut 15 and the abutting surface 16 of the sleeve socket 12 a helical spring 17 is arranged, said spring serving the purpose to automatically allow the outer end of the band to move and thus the band as a whole to expand or to be tightened in all after circumstances. If for instance the wheel and thus its felly should shrink on account of dry warm weather the iron band will be tightened by the spring and if on wet days the felly swells the band can expand accordingly. To meet greater variations in the circumference of the felly caused for example by great heat in the summer time and extreme moisture in the winter time the iron band may of course be adjusted manually by screwing the nut on the bolt or unscrewing the same.

On account of the iron band not requiring any welding together of its ends the band may be made of hardened steel whereby the life of the same is considerably prolongated and further the band may be fitted to the wheel by anyone not skilled in the art.

Further advantages connected with the improved means consist in that the wheel may be impregnated or painted before the band is put on as such impregnating will not be damaged because the band need not be put on in a heated condition, and the wood of the wheel together with the joints of the felly will be preserved as the band always keeps the same in a tightened condition.

What we claim and desire to secure by Letters Patent is:—

1. In a wheel, the combination with the wooden felly thereof, of a socket secured to the inside of the felly, a tire on the wheel and formed with overlapping ends for providing a smooth outer surface on the tire, the inner one of the ends being secured to the felly, the outer one of the ends having a slidable fit on the inner end, a recess in the outer end of the tire, a draw-bolt provided at one end with a head fitted in the recess in the outer end of the tire, corresponding slots in the inner end of the tire and felly, the draw-bolt extending through the slots in the inner end of the tire and the felly and through the socket, and resilient tightening means on a projecting end of the draw-bolt.

2. In a wheel, the combination with the wooden felly thereof, of a socket, a plate integral with the socket and secured to the inside of the felly, a tire on the wheel and formed with overlapping ends, the inner one of the ends being secured to the felly and the outer one of the ends having a slidable fit on the inner end, the outer end being tapered, a corresponding taper formed partly on the felly and partly on the tire inner end, the tapers interacting to form a smooth outer surface on the tire, a recess in the outer end of the tire, a draw-bolt provided at one end with a head fitted in the recess in the outer end, corresponding slots in the inner end of the tire and the felly, the draw-bolt extending through the slots and the socket, a tightening nut on a projecting end of the draw-bolt, and a coiled spring interposed between the tightening nut and the socket.

In testimony whereof, we have signed our names to this specification in the presence of two subscribing witnesses.

CARL ALBERT HAMMARLUND.
WILHELM SEGERSTROM.

Witnesses:
   ERIC ERICSSON,
   G. PETERSON.